3,374,290
POLYETHYLENE CONTAINING HOMOPOLYMER OF $C_{14-16}$ ALPHA-MONOOLEFIN

Norman W. Franke, Penn Hills Township, Allegheny County, and Joseph C. Martini, Export, Pa., assignors to Gulf Research & Development Company, Pittsburgh, Pa., a corporation of Delaware
No Drawing. Filed Nov. 2, 1965, Ser. No. 506,112
6 Claims. (Cl. 260—897)

ABSTRACT OF THE DISCLOSURE

A new polyethylene composition is claimed which has both improved environmental stress cracking resistance and melt index properties. The composition consists of between 80 and 98 weight percent polyethylene and between 2 and 20 weight percent of a n-1-monoolefin homopolymer wherein the monoolefin has between 14 and 16 carbon atoms.

---

This invention relates to new polyethylene compositions of matter having improved stress cracking resistance together with improved melt viscosity characteristics.

Polyethylene is a product of considerable commercial importance. It was originally produced by what is known as the high pressure technique, and the resulting product had a low density of about 0.91 to 0.93 gram per cc. More recently polyethylene processes have been developed using low pressures and novel catalyst systems. The low pressure polyethylenes tend to have high densities between about 0.94 and 0.99 gram per cc. Polyethylenes having densities between 0.93 and 0.94 gram per cc. are usually blends of the high and low density polyethylenes. While these polyethylenes have many valuable properties, they do, for certain purposes, have disadvantages, such as cracking under stress in the presence of polar liquids as well as being too viscous on melting to be easily handleable in processing equipment.

It is one of the objects of this invention to simultaneously improve both the environmental stress cracking resistance (ESR) and viscosity characteristics of polyethylene. The ESR is measured by ASTM Test No. D-1693-60T while an improvement in viscosity characteristics is noted by an increase in the melt index (MI) of the polymer as measured by ASTM Test No. D-1238-62T.

It has been found in accordance with the invention that the ESR and MI of both low and high density polyethylenes can be simultaneously improved by the addition and blending with the polyethylenes of certain amounts and types of polymers of alpha olefins having more than two carbon atoms per molecule.

In accordance with the invention, a polyethylene having improved melt index and environmental stress cracking resistance properties cosists of a blend of between 80 and 98 percent by weight of a polyethylene and between 2 and 20 weight percent of a linear alpha olefin polymer, substantially each alternate carbon atom in the linear polymer chain having dependent therefrom an alkyl radical having between 6 and 14 carbon atoms.

In one aspect of this invention, a high density polyethylene having a density between 0.94 and 0.99 is improved in both melt index and environmental stress cracking resistance properties by the addition and blending with the high density polyethylene of between 1 and 20 weight percent of the total polymer of a low molecular weight linear alpha olefin polymer, substantially each alternate carbon atom in the linear polymer chain having dependent therefrom an alkyl radical having between 1 and 5 carbon atoms.

In another aspect of this invention, a low density polyethylene having a density between 0.91 and 0.93 is improved in both melt index and environmental stress cracking resistance properties by the addition and blending with the low density polyethylene of between 2 and 20 weight percent of the total polymer of a high molecular weight linear alpha olefin polymer, substantially each alternate carbon atom in the linear polymer chain having dependent therefrom an alkyl radical having between 15 and 16 carbon atoms.

Any polyethylene is suitable for use in the compositions of this invention. That is, both the high and low density polyethylenes or mixtures of the same can be employed. Thus, polyethylenes having densities between 0.91 and 0.99 as measured by ASTM Test No. D-1505-63T can suitably be employed. In some aspects of this invention, the compositions contain a high density polyethylene only and by high density polyethylene is meant one which has a density between 0.94 and 0.99 gram per cc. Minor amounts of other olefinic monomers, such as propylene, styrene, vinyl acetate, etc. can be incorporated with the polyethylene. By minor amounts is meant amounts less than about two weight percent.

The polyethylene is further characterized by its melt index which is suitably between 0.1 and 30 as measured by ASTM Test D-1238-62T. The polyethylene usually has a weight average molecular weight of between 15,000 and 3,000,000, and more usually between 100,000 and 1,000,000.

The polyethylenes can be prepared by any suitable procedure, and the particular procedure used forms no part of this invention. The polyethylene can be prepared by the older high pressure techniques well known in the art or by the newer low pressure techniques, such as that described hereinafter for the preparation of the higher carbon number alpha olefin polymers. Other suitable methods include those described in U.S. 2,825,721 to Hogan et al.

Both the melt index and environmental stress cracking resistance of any of the polyethylenes described above are improved by the addition and blending with the polyethylene of between 2 and 20 weight percent of the total composition of a polymer of an alpha olefin having between 8 and 16 carbon atoms per molecule. The degree of improvement is a function, not only of the amount of added polymer of the higher carbon number alpha olefin, but also of the particular polyalpha olefin employed.

The selected polymers of the higher carbon number alpha olefins which are utilized to form the compositions of this invention together with polyethylene have the general formula:

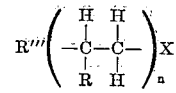

where R is an alkyl radical having one to 14 carbon atoms; R''' is the same as R''' defined hereinafter for the organic aluminum catalyst component; n is an integer greater than 25; and x is selected from the group consisting of hydrogen;

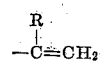

where R is as defined above; and possibly trace amounts of a metal selected from the group consisting of the metal polymerization catalyst components as defined hereinafter.

The selected higher carbon number alpha olefin polymers which are blended with polyethylene to form the compositions of this invention can have any suitable molecular weight when the alpha olefin has between 8 and 16 carbon atoms per molecule. The dilute solution viscosity of the higher carbon number alpha olefin polymer which is a measure of molecular weight, can suitably be between 0.2 and 10 deciliters per gram. The low molecular weight polymers prepared from alpha olefins having between 3 and about 10 carbon atoms per molecule have dilute solution viscosities of between about 0.4 and about 2, preferably between 0.6 and 1.2, while high molecular weight polymers of the same olefins have dilute solution viscosities between about 2 and 10, preferably between 4 and 7. The low molecular weight polymers prepared from alpha olefins having between about 11 and 18 carbon atoms per molecule have dilute solution viscosities between about 0.2 and 1.0, preferably between about 0.5 and 1.0, while the high molecular weight polymers of the same olefins have dilute solution viscosities between 1 and 5, preferably between 1 and 3. The dilute solution viscosities are measured in accordance with ASTM Test No. D-1601 except heptane is used as the solvent at a temperature of 100° F.

In one aspect of this invention, as will be discussed more fully below, the melt index and ESR of a high density polyethylene are simultaneously improved by the addition to the high density polyethylene of a low molecular weight polymer of an alpha olefin having between 3 and 7 carbon atoms per molecule. In these compositions, a low molecular weight means a polymer having a dilute solution viscosity between 0.4 and 2 and preferably between 0.6 and 1.2. The addition of high molecular weight $C_3$–$C_7$ alpha olefin polymers to polyethylene and the addition of low molecular weight $C_3$–$C_7$ alpha olefin polymers to low density polyethylenes may result in an improvement in ESR or MI, but not a simultaneous improvement in both.

In another aspect of this invention, as will be discussed more fully below, both the MI and ESR of a low density polyethylene are simultaneously improved by the addition to the low density polyethylene of a high molecular weight polymer of an olefin having between 17 and 18 carbon atoms per molecule. In these compositions, a high molecular weight means a polymer having a dilute solution viscosity between 1 and 5 and preferably between 1 and 3. The addition of low molecular weight $C_{17}$–$C_{18}$ polymers to high density polyethylene may result in an improvement in either ESR or MI, but not a simultaneous improvement in both.

The selected higher carbon number alpha olefin polymers utilized in the compositions of the present invention can be prepared by any suitable process. One satisfactory polymerization process comprises the polymerization of an alpha olefin having from 3 to 18 carbon atoms per molecule, preferably 8 to 16 carbon atoms per molecule, by means of a catalyst complex comprising an organo-aluminum compound and a heavy metal compound. The organo-aluminum compound contains at least one hydrocarbon radical linked through a carbon atom directly to the aluminum. Organo-aluminum compounds that can be employed can be represented by the structural formula:

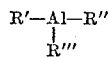

wherein R′ is a hydrocarbon radical such as an alkyl, aralkyl, aryl, alkaryl. or cycloalkyl radical, examples of such radicals being ethyl, propyl, isobutyl, amyl, hexyl, dodecyl, phenylethyl, benzyl, phenyl, tertiarybutylphenyl, and cyclohexyl radicals; R″ is also a hydrocarbon radical as above defined, an OR′ radical, hydrogen, or halogen such as chlorine, bromine, iodine, and fluorine; and R‴ is hydrogen or a hydrocarbon radical as defined above.

Examples of such organo-aluminum compounds are triisobutylaluminum, diisobutylaluminm hydride; dipropylalminum chloride; phenylaluminum dihydride; dioctylaluminum bromide; cyclohexyl-bromo-aluminum hydride; ditertiarybutylphenylaluminum hydride; n-pentylisobutylaluminum chloride; dioctylaluminum hydride; and dipropylcyclohexyl aluminum.

The heavy metal compound constituting a component of the catalyst is a compound of a metal occupying the fourth to the sixth positions of the long periods of the Periodic Table in which the elements are arranged in short and long periods and the alkali metals occupy the first position (see Periodic Chart of the Elements on pages 448 and 449 of the 43rd edition of "Handbook of Chemistry and Physics, 1961–1962," published by Chemical Rubber Publishing Company). These metals are titanium, zirconium, hafnium, vanadium, niobium (columbium), tantalum, chromium, molybdenum, tungsten and metals in the corresponding positions in the last long period in the so-called "actinium series," that is, thorium, protactinium and uranium. The preferred heavy metal compounds are the salts of the heavy metal with monovalent anions. Especially preferred are the halides (chlorides, bromides, iodides and fluorides) and acetyl acetonates of titanium, zirconium and thorium. Titanium halides, especially titanium chlorides, and more especially titanium trichloride, constitute preferred heavy metal compounds. Other heavy metal compounds include other inorganic salts of the metals such as oxyhalides, sulfates, nitrates and sulfides and other organic salts such as acetates and oxalates of the heavy metals.

The molar ratio of the organo-aluminum compound to the heavy metal compound may be varied over a wide range. In general, larger ratios of the organo-aluminum compound to the heavy metal compound are employed when the heavy metal compound is present in the higher valence state. The molar ratio of the organo-aluminum compound to the heavy metal compound can vary between about 0.1:1 and 10:1 with preferred ratios between about 0.4:1 and 3:1.

The alpha olefins which can be employed to produce the polymers for use in the compositions of this invention comprise those alpha olefins which have between 3 and 18 carbon atoms per molecule. The preferred alpha olefins are those having between 8 and 16 carbon atoms per molecule and still more preferred are the substantially straight chain alpha olefins having between 8 and 16 carbon atoms per molecule. Mixtures of alpha olefins can also suitably be employed. In addition, in the event small amounts of internal olefins are present in the charge, a portion of these may enter into the polymerization reaction. Suitable olefins or mixtures of olefins may be obtained, for example, from wax-cracking, polymerization or the more recent telomerization process, such as that described in "Annalen die Chemie" 629, 1–256 (1960). Examples of suitable olefins include propylene; 1 - butene; 1 - pentene; 1 - hexene; 1 - heptene; 1 - octene; 3 - methyl - 1 - heptene; 1 - nonene; 2 - methyl - 1- octene; 1 - decene; 1 - dodecene; 1 - tetradecene; 1 - pentadecene; 1 - hexadecene; 1 - heptadecene and 1 - octadecene.

The catalyst comprising the organo-aluminum compound and the heavy metal compound should be employed in a concentration such that the organo-aluminum compound is present in a concentration of at least 0.1 millimole per liter of alpha olefin. The preferred concentration of the organo-aluminum compound is between about 1.5 to 100 millimoles per liter of alpha olefin.

Although a reaction solvent is not necessary, it is preferred that a reaction solvent be employed. A reaction solvent may be any non-polymerizing inert liquid. Examples of suitable inert reaction solvents include saturated hydrocarbons, such as heptane or cyclohexane, as well as liquid aromatic hydrocarbons, such as benzene. The reaction solvent should preferably have from about 4 to 10 carbon atoms per molecule and should be used in an amount from about 1.0 to about 50 volumes for each volume of the olefin monomer.

Any polymerization pressure can be employed. Thus, pressures from atmospheric or below to 1000 p.s.i.g. or higher can be employed. Atmospheric pressure is, of course, preferred. Any polymerization temperatures can be employed so long as the reactants are maintained in the liquid phase and neither the catalyst, solvent or olefin are thermally decomposed. Thus, the lower limit for the reaction temperature is determined by the freezing point of the reactants while the upper temperature is limited by the vaporization temperature of the reactants under the reaction pressure employed or the thermal decomposition point of the catalyst or reactants. In general, reaction temperatures between $-40°$ and $120°$ C. are preferred with still more preferred temperatures being between $25°$ and $80°$ C.

The reaction time should be sufficient to yield a satisfactory conversion of olefin to polymer. The reaction time can be between 0.1 and 24 hours with preferred reaction times between 1 and 10 hours.

The reaction product from the polymerization process comprises polymer, catalyst, and reaction solvent, if employed. The catalyst is generally inactivated by the addition of an active hydrogen compound, e.g. an alcohol such as, for example, isopropanol or water to the reaction product. The addition of the alcohol or water also serves to quench the reaction product, dissolve catalyst, and coagulate the polymer into a solid. The polymer is thereafter separated by any suitable means, such as centrifugation, from the alcohol and reaction solvent, if any, and further treated to remove residual amounts of catalyst. For example, the polymer can be further washed or treated with dilute hydrochloric acid to convert the catalyst into soluble chlorides. If the acid treatment is used, the polymer would then be neutralized with dilute caustic and washed with further amounts of an alcohol, such as isopropanol.

The compositions of this invention comprise between 80 and 98 weight percent of a polyethylene as described above and between 2 and 20 weight percent of at least one of the higher carbon number alpha olefin polymers as described above. The more preferred compositions are those containing between 85 and 95 weight percent of a polyethylene and between 5 and 15 weight percent of a higher carbon number alph olefin polymer. Polytetradecene is the most preferred alpha olefin polymer for use in the compositions of this invention.

Any suitable method of blending known in the art can be used to prepare the compositions of this invention. The two polymers may, for example, be precipitated from mutual solvent by cooling or by the addition of a non-solvent; or the polymers may be blended by mixing at temperatures above their softening points on a device, such as a roll mill.

The invention will be further described with reference to the following experimental work.

In all of the examples, the low and high density polyethylenes were purchased from the Koppers Company under the trade names Dylan 1220 and Super Dylan 7004. Dylan 1220 polyethylene has a density of 0.916 grams per cc. and a melt index of 27. Super Dylan 7004 has a density of 0.964 and a melt index of 0.6. The environmental stress cracking resistances of the Dylan 1220 and Super Dylan 7004 were 3 minutes and 11 hours respectively.

The polypropylene was purchased from the Avisun Corporation and the low molecular weight polymer designated as Avisun 4018 had a melt index of 13 and a dilute solution viscosity of 2 to 2.5 by ASTM Test D-1601 except Decalin was used at $275°$ F. The high molecular weight polymer designated as Avisun 1011 had a melt index of 0.7 and a dilute solution viscosity of 3.5 to 4 by ASTM Test D-1601 except Decaline was used at $275°$ C.

The higher carbon number alpha olefin polymers, i.e. polybutene through polycosene, were prepared by the same general procedure. About 100 cc. of the particular alpha olefin, for example hexene-1, was added to 500 cc. of cyclohexane which had been dried over molecular sieves. To this mixture was added $TiCl_3$ and triethylaluminum in the desired amounts, and the entire mixture was then held at the autogenous pressure of the reaction at a temperature between about $20°$ C. and $70°$ C. for times between about 3 and 24 hours with constant agitation to insure thorough mixing. The product was coagulated and the catalyst killed by the addition of isopropyl alcohol. The polymer product was separated, washed with alcohol, and dried in vacuum.

The molecular weight of the various higher carbon number alpha olefin polymers was varied by changing the amount of catalyst employed, the reaction time and the reaction temperature, the lower molecular weight products being made using the higher catalyst concentrations, the higher reaction temperatures and shorter reaction times.

The polycosene used in the examples below was prepared from a mixture of alpha olefins having predominantly between 20 and 28 carbon atoms per molecule. This mixture was the $385°$ F. at 5 mm. Hg to $554°$ F. at 1 mm. Hg boiling range cut of the product obtained by the telomerization of ethylene at $200°$ C. and 4,000 p.s.i.g. in the presence of three weight percent of a catalyst comprising triethylaluminum for about 15 minutes. The specific gravity of the mixture of cosenes was 0.865 and the olefin distribution in percent by weight was 16 percent $C_{20}$; 24 percent $C_{22}$; 18 percent $C_{24}$; 14 percent $C_{26}$; 10 percent $C_{28}$; 7 percent $C_{30}$; and 11 percent $C_{32}$ to $C_{42}$.

Melt indices could not be obtained on the polymers prepared from the alpha olefins having four carbon atoms or more per molecule. The dilute solution viscosities of the polymers are given in Table I below. The dilute solution viscosities were run by ASTM D-1601 except heptane was used at $100°$ F.

TABLE I

| | Dilute Solution Viscosity, Molecular Weight | |
|---|---|---|
| | Low | High |
| Polymer of— | | |
| butene-1 [1] | | 2.5 |
| hexene-1 | 1.7 | 4.6 |
| tetradecene-1 | 0.9 | 1.4 |
| octadecene-1 | 0.4 | 1.9 |
| cosenes mixture | 0.7 | 0.5 |

[1] Dilute solution viscosity run in decalin at $210°$ F.

The polymer of the higher carbon number alpha olefin was blended into the desired polyethylene on a two roll rubber mill steam heated to about $270°$ F. for about seven minutes.

A first series of blends were made using the low density Dylan 1220 polyethylene and varying amounts (1, 5, 10 or 20 weight percent of total polymer) of the low molecular polymers of hexene-1; tetradecene-1; octadecene-1 and cosenes mixture described in Table I above. The ESR and MI were determined for all of the blends. The results are summarized in Table II below.

TABLE II.—ESR AND MI DATA FOR BLENDS OF LOW DENSITY POLYETHYLENE AND VARYING AMOUNTS OF LOW MOLECULAR WEIGHT POLYMERS OF HIGHER CARBON NUMBER OLEFINS

| Modifier to Low Density Polyethylene | Amount of Modifier, Wt. Percent of Total Polymer | Properties | |
|---|---|---|---|
| | | ESR, Minutes: Seconds | MI, grams/10 minutes |
| None | 0 | 3:10 | 27 |
| Polyhexene | 1 | 3:45 | 27 |
| Do | 5 | 5:10 | 27 |
| Do | 10 | 9:45 | 27 |
| Do | 20 | 24:00 | 27 |
| Polytetradecene | 1 | 4:07 | 27 |
| Do | 5 | 4:10 | 30 |
| Do | 10 | 5:45 | 42 |
| Do | 20 | 11:15 | 68 |
| Polyoctadecene | 1 | 3:30 | 29 |
| Do | 5 | 3:20 | 36 |
| Do | 10 | 3:15 | 51 |
| Do | 20 | 3:30 | 113 |
| Polycosene | 1 | 3:14 | 29 |
| Do | 5 | 3:15 | 35 |
| Do | 10 | 2:20 | 48 |
| Do | 20 | 1:25 | 95 |

Referring to Table II, it can be seen that the addition of low molecular weight polyhexene, polyoctadecene and polycosene results in an improvement in either MI or ESR, but not both simultaneously, while the addition of polytetradecene results in increases in both MI and ESR.

A second series of blends were made the same as the first series except the added higher carbon number alpha olefins were the high molecular weight polymers shown in Table I and the polybutene was also added. The effect of the added polymers on the MI and ESR of the low density polyethylenes are summarized in Table III below.

TABLE III.—ESR AND MI DATA FOR BLENDS OF LOW DENSITY POLYETHYLENE AND VARYING AMOUNTS OF HIGH MOLECULAR WEIGHT POLYMERS OF HIGHER CARBON NUMBER OLEFINS

| Modifier to Low Density Polyethylene | Amount of Modifier, Wt. Percent of Total Polymer | Properties | |
|---|---|---|---|
| | | ESR, Minutes: Seconds | MI, grams/10 minutes |
| None | 0 | 3:10 | 27 |
| Polybutene | 1 | 3:11 | 27 |
| Do | 5 | 5:15 | 23 |
| Do | 10 | 11:33 | 21 |
| Do | 20 | 22:20 | 19 |
| Polyhexene | 1 | 3:45 | 28 |
| Do | 5 | 5:15 | 25 |
| Do | 10 | 10:30 | 22 |
| Do | 20 | 14:32 | 15 |
| Polytetradecene | 1 | 4:20 | 29 |
| Do | 5 | 4:10 | 31 |
| Do | 10 | 6:18 | 36 |
| Do | 20 | 7:30 | 42 |
| Polyoctadecene | 1 | 4:30 | 30 |
| Do | 5 | 4:40 | 34 |
| Do | 10 | 4:40 | 39 |
| Do | 20 | 4:55 | 59 |
| Polycosene | 1 | 3:20 | 28 |
| Do | 5 | 2:55 | 41 |
| Do | 10 | 2:02 | 56 |
| Do | 20 | 1:04 | 110 |

Referring to Table III, it can be seen that the addition of polycosene results in an improvement in MI, but a decrease in ESR, while the addition of polybutene and polyhexene results in increases in ESR while decreasing the MI. It is only the addition of polytetradecene and polyoctadecene to the low density polyethylene which results in a simultaneous improvement in both the ESR and MI of the polyethylene.

A third series of blends were made using the high density Super Dylan 7004 polyethylene and varying amounts (1 and 10 weight percent) of a low molecular weight polymer of propylene; hexene-1; tetradecene-1; octadecene-1 and the mixture of $C_{20}+$ olefins. The ESR and MI were determined for each of the blends. The results are summarized in Table IV below.

TABLE IV.—ESR AND MI DATA FOR BLENDS OF HIGH DENSITY POLYETHYLENE AND VARYING AMOUNTS OF LOW MOLECULAR WEIGHT POLYMERS OF HIGHER CARBON NUMBER OLEFINS

| Modifier to High Density Polyethylene | Amount of Modifier, Wt. Percent of Total Polymer | Properties | |
|---|---|---|---|
| | | ESR, Minutes: Seconds | MI, grams/10 minutes |
| None | 0 | 11 | 0.6 |
| Polypropylene | 1 | 21 | 0.6 |
| Do | 10 | 14 | 0.8 |
| Polyhexene | 1 | 14 | 0.5 |
| Do | 10 | 20 | 0.7 |
| Polytetradecene | 1 | 14 | 0.6 |
| Do | 10 | 15 | 1.0 |
| Polyoctadecene | 1 | 12 | 0.6 |
| Do | 10 | (¹) | 1.0 |
| Polycosene | 1 | 8 | 0.6 |
| Do | 10 | (²) | 3.7 |

¹ Too poor to test.
² Failed during bending.

Referring to Table IV, it can be seen that the addition of a low molecular weight polyoctadecene and polycosene results in an improvement in MI, but not ESR, while the addition of polypropylene, polyhexene and polytetradecene results in increases in both MI and ESR.

A fourth series of blends were prepared as in the third series except the added higher carbon number alpha olefins were the high molecular weight polymers described in Table I above. The effect of the added polymers on the MI and ESR of the high density polyethylene are summarized in Table V below.

TABLE V.—ESR AND MI DATA FOR BLENDS OF HIGH DENSITY POLYETHYLENE AND VARYING AMOUNTS OF HIGH MOLECULAR WEIGHT POLYMERS OF HIGHER CARBON NUMBER OLEFINS

| Modifier to High Density Polyethylene | Amount of Modifier, Wt. Percent of Total Polymer | Properties | |
|---|---|---|---|
| | | ESR, Minutes: Seconds | MI, grams/10 minutes |
| None | 0 | 11 | 0.6 |
| Polypropylene | 1 | 14 | 0.6 |
| Do | 10 | 12 | 0.6 |
| Polybutene | 1 | 11 | 0.7 |
| Do | 10 | 23 | 0.6 |
| Polyhexene | 1 | 14 | 0.5 |
| Do | 10 | 14 | 0.5 |
| Polytetradecene | 1 | 14 | 0.5 |
| Do | 10 | 14 | 0.9 |
| Polyoctadecene | 1 | 11 | 0.6 |
| Do | 10 | 14 | 0.7 |
| Polycosene | 1 | 10 | 0.8 |
| Do | 10 | 11 | 1.2 |

Referring to Table V, it can be seen that the addition of a high molecular weight polypropylene, polybutene, polyhexene and polycosene results in an improvement in either MI or ESR, but not both, while the addition of polytetradecene and polyoctadecene results in an improvement in both MI and ESR.

The above data in Tables II through V show that the melt index and environmental resistance properties of both high and low density polyethylenes are simultaneously improved only when the added polyalpha olefin is prepared from an alpha olefin having between 8 and 16 carbon atoms per molecule. The low density polyethylene is additionally improved in both MI and ESR properties by the addition of only high molecular weight polymers of alpha olefins having between 17 and 18 carbon atoms per molecule. The high density polyethylene is additionally improved in both MI and ESR properties by the addition of only low molecular weight polymers of alpha olefins having between 3 and 7 carbon atoms per molecule.

As a result of the combination of improved MI and ESR properties, the polyethylenes can be processed more easily and used in products where improved ESR is desirable, such as in the production of household items subject to contact with detergents, or in the production of oil cans containing high detergency oils.

The blended compositions of this invention may, of course, contain fillers, antioxidants, dyes, antislip agents, and similar materials known in the art.

Resort may be had to such variations and modifications as fall within the spirit of the invention and the scope of the appended claims.

We claim:

1. A polyethylene composition of matter having both improved environmental stress cracking resistance and melt index properties which consists of between 80 and 98 percent by weight of polyethylene having a molecular weight between 15,000 and 3,000,000 and between 2 and 20 percent by weight of a n-1-monoolefin homopolymer, said monoolefin having 14–16 carbon atoms and said homopolymer having a dilute solution viscosity between 0.2 and 10 deciliters per gram.

2. A composition according to claim 1 wherein the monoolefin has 14 carbon atoms.

3. A composition according to claim 2 wherein the percent by weight of polyethylene is between 85 and 95 and the percent by weight of the said n-1-monoolefin homopolymer is between 5 and 15.

4. A method of improving both the environmental stress cracking resistance and melt index properties of polyethylene having a molecular weight between 15,000 and 3,000,000 which comprises blending with the polyethylene between 2 and 20 weight percent of the total polymer of a second homopolymer of an alpha-monoolefin having between 14 and 16 carbon atoms per molecule, said second polymer having a dilute solution viscosity between 0.2 and 10 deciliters per gram.

5. A method according to claim 4 wherein said blending occurs at a temperature above the softening points of both the polyethylene and the second polyolefin.

6. A method of improving both the environmental stress cracking resistance and melt index properties of polyethylene having a molecular weight between 15,000 and 3,000,000 which comprises blending with the polyethylene between 2 and 20 weight percent of the total polymer of a second homopolymer of an alpha-monoolefin having 14 carbon atoms per molecule, said second polymer having a dilute solution viscosity between 0.2 and 10 deciliters per gram.

References Cited

UNITED STATES PATENTS

| 3,137,672 | 6/1964 | Lehane | 260—897 |
| 3,183,283 | 5/1965 | Reding | 260—897 |
| 3,250,825 | 5/1966 | Martinovitch | 260—897 |

FOREIGN PATENTS

| 927,881 | 6/1963 | Great Britain. |
| 240,283 | 8/1962 | Austria. |

OTHER REFERENCES

Dunham, K. R., et al.: In J. Poly. Sci. PFA, vol. 1, pp. 751–762 (1963).

GEORGE F. LESMES, *Primary Examiner.*

MURRAY TILLMAN, *Examiner.*

T. G. FIELD, JR., *Assistant Examiner.*